United States Patent [19]

Lameiro

[11] Patent Number: 4,951,395
[45] Date of Patent: Aug. 28, 1990

[54] DRYWALL DIE-CUTTING FOR ELECTRICAL OUTLET BOXES

[76] Inventor: Jose Lameiro, 137 Hillmount Ave., Toronto, Ontario, Canada, M6B 1X7

[21] Appl. No.: 135,239

[22] Filed: Dec. 17, 1987

[51] Int. Cl.$^5$ ................................................. B26F 1/00
[52] U.S. Cl. .......................................... 30/360; 30/361; 30/366
[58] Field of Search ................... 30/360, 361; 144/137, 144/2 R

[56] References Cited

U.S. PATENT DOCUMENTS

| | | | |
|---|---|---|---|
| 3,391,460 | 7/1968 | Moore | 30/366 |
| 4,087,913 | 5/1978 | Jackson | 30/360 |
| 4,724,616 | 2/1988 | Adleman, et al. | 30/361 |
| 4,730,395 | 3/1988 | Blessing, Sr. | 30/360 |

*Primary Examiner*—W. Donald Bray

[57] ABSTRACT

The drywall die-cutting tool is comprised of a female plate having a center opening outlining a given size and shape with four corner holes to receive the legs of the extracting mechanism, and a male plate, being the cutout of the female plate. The male plate has attached to the back face a convenient number of spring prongs to provide temporary fixation to an outlet box supported an a wall stud, said male plate also has, perpendicular at the center of the front face, a rectangular sharp pointy biade able to penetrate through a drywall board or any covering material when placed and pressed against it. The extracting mechanism, already engaged to the corner holes of the female plate, and having a sliding shaft which houses and engages the blade, has an arm lever that when pressed pulls the sliding shaft engaged to the blade, exerting a pressure between the interior male plate, the center drywall board, and the exterior femal plate, thus forcing the male plate through the female plate producing in this manner the desired hole in the drywall board. Once this is executed, the whole tool can be pulled out and disengaged for the next operation.

5 Claims, 1 Drawing Sheet

DRYWALL DIE-CUTTING FOR ELECTRICAL OUTLET BOXES

BACKGROUND OF THE INVENTION

In the building construction industry it is known that in the master walls as well as in the dividing walls (supported by wood or metal studs), the boxes (designated for the future installation of electrical, telephone, television or computer outlets), are embedded in the walls or fastened to the wall-frame studs, or other materials. These master walls and dividing walls are ordinarily covered with prefabricated drywall panels. In order to provide access to previously installed outlet boxes for the installation of the required receptacles or fixtures, it is necessary to cut box-fitting holes into the drywall panels. The box-fitting holes are ordinarily cut with a knife or drywall saw. If the opening is cut around the box after the installation of the drywall panel, the knife or drywall saw may accidentally go inside the box and damage the insulation of the wires. If the opening is cut before as well as after the drywall is placed on the wall, it is necessary to take precise measurements. All this requires time and labour, consequently increasing construction costs.

In the past various tools have been devised to cut the hole in the panel. However, the most commonly used method is the one consisting of exact measurement with the use of a knife or drywall saw. The previous inventions do not seem to solve the problem effectively, probably because they require extra electrical tools or because the cut-out drywall piece, is pressed too tightly inside the tools performing the operation; thus requiring too much time to clean out and prepare for the next operation.

It is the object of this invention to provide a tool which can efficiently cut outlet fitting holes of any size and shape without taking any measurements, damaging the pre-installed wires inside the outlet box, or using electrical power tools.

BRIEF DESCRIPTION OF THE PRESENT INVENTION

The drywall die-cutter consists of a male plate having both the front and back sides flat and of the same shape as the outlet box used, said male plate having two or more spring prongs, (depending on the shape and type of outlet box). Said prongs temporarily fasten the plate to an installed box in the wall by using the existing outlet fastening holes or by fitting snugly in the corners of the outlet box. When the said holes are missing the spring prongs are increased to four or more and located in the corresponding corners. Said male plate has a rectangular blade attached perpendicularly at the center of the outer face so as to penetrate the drywall panel when the panel is placed over and pushed onto the male plate on the box. Therefore, the blade indicates the exact position of the box and is ready to be engaged to the shaft of the extracting mechanism. The female plate is a flat plate with a centre opening having the shape of the male plate, with four or more corner holes serving as support for the table-legs of the extracting mechanism. The extracting tool has a handle which houses a sliding ratched shaft, said shaft having a housing at the front end into which the rectangular blade of the male plate can fit and engage with a pin through the matching hole of the rectangular blade and the sliding shaft. The handle provides support to an arm lever that engages the ratchet shaft by means of a pawl that engages the teeth of the sliding shaft; repeated pressing of the arm lever causes the shaft to move backwards, and as a result of being engaged with the blade, a pressure is created between the interior male plate, the central drywall panel and exterior female plate, thus forcing the male plate through the drywall and female plate, producing the appropriate opening in the board.

DETAILED DESCRIPTION OF THE PREFERRED EMBODIMENTS

In the die-cutting tool, it can be distinguished: a male plate (c), a female plate (e) and an extracting mechanism, which could be named also extracting tool or extracting apparatus.

Figure 1:
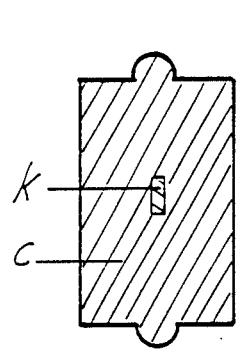
FIG. 1. Is a front view drawing showing the male plate, having the shape of one of the most commonly used boxes, and the rectangular blade.

Refering to the male plate (c) in FIG. 1, its shape ressembles a commonly used outlet box.

Figure 2:
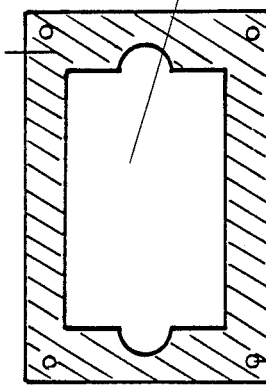
FIG. 2. Is a front view drawing showing the female plate with the corner fitting holes for the legs of the extracting mechanism.
Figure 3:
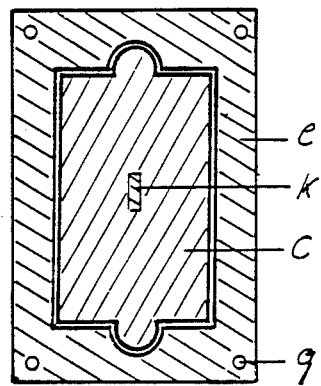
FIG. 3. Is a front view drawing showing the male plate inside of the female plate.

In FIG. 2, (e) is the female plate from where the male plate (c) has been cut out, with the resulting opening (r) slightly enlarged, thus providing in this way an easy passage for the male plate (c) through the female plate's opening (r) as shown in FIG. 3 where the male plate (c) is inside of the female plate (e), said female plate (e) is provided with four corner holes (q) corresponding with the four legs (g) of the extracting apparatus.

Figure 4:
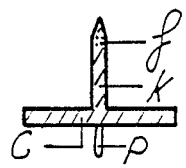
FIG. 4. Is a width-side view of the male plate with only one rectangular blade and the supporting spring prongs.
Figure 5:
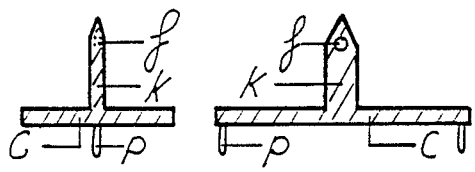
FIG. 5. Is a length-side view of the male plate with only one rectangular blade and the supporting spring prongs.
Figure 6:
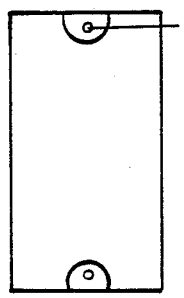
FIGS. 6 and 7 are the shapes of two other types of outlet boxes commonly used for different fixtures, for any of which male and female plates with the specific shape of the box are required to cut the necessary opening.
Figure 7:
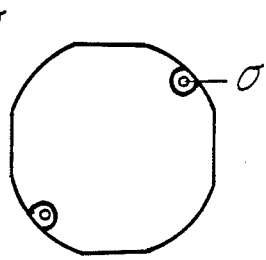

FIG. 4 and FIG. 5 are the width and length side views, respectively, of the male plate (c) where the spring prongs (p) are projected perpendicular to the back side of the male plate (c) and positioned exactly corresponding to the threaded fastening holes (o) of the outlet box (which could also be any type of fixture to be covered by any material) through which they can be pushed for temporary support. When the outlet boxes or fixtures (b) lack fastening holes (o), the spring prongs (p) are increased to four or more and positioned at the corners of the male plate, corresponding to the corners of the outlet box for temporary support.

In FIG. 4 and FIG. 5 the side and front views of the rectangular blade (k) on the male plate (c) can be seen, (although refering to a single rectangular blade, for purpose of simplification, it should be understood that it could be increased to two or more, attached perpendicularly and symmetrically to the outer face of the plate). The blade (k) ends in a rectangular base pyramidal point facilitating the penetration of the drywall board or covering material (d) when said material (d) is placed over and pressed onto the wall studs (a) and blade (k). The blade (k) also has one or more holes (f) (only one is showing in the drawing) corresponding to the holes of the ratchet shaft (h) (also only one is showing) of the extracting mechanism so that a pin can be inserted to securely engage the blade (k) to the ratchet shaft (h).

Figure 8:
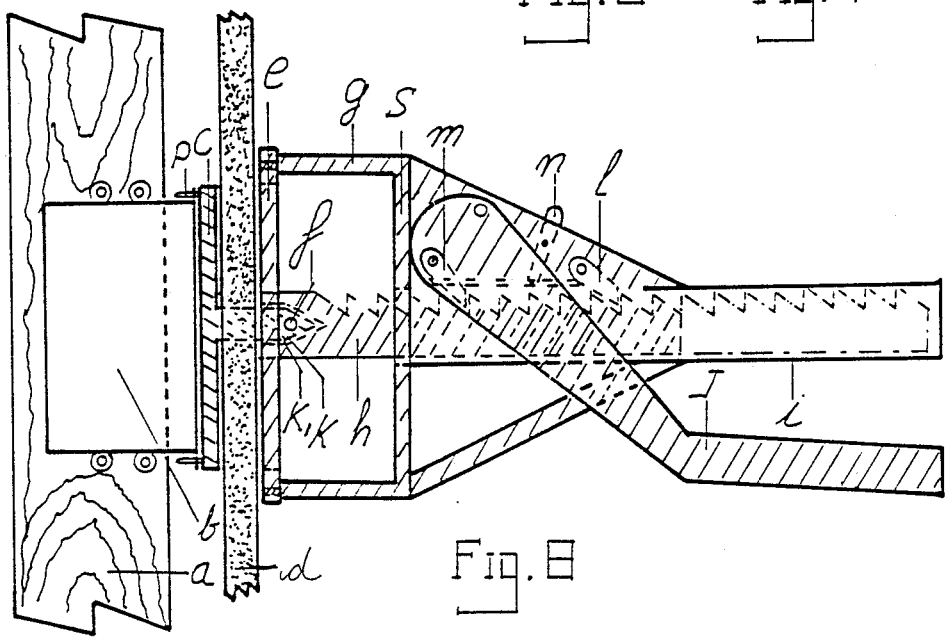
FIG. 8 is a cross-section view of the die-cutting tool ready for operation.

FIG. 8 shows the die-cutting tool ready to be used where (a) is a stud where the outlet box (b) is fastened for the future installation of the required fixture; on the front of the outlet box (b) sits the male plate (c) supported by the spring prongs (p) passing through the future fixture supporting holes (o); covering the male plate (c) is the drywall board or covering material (d) in which the opening is to be made, with the blade (k) already through it and engaged with the shaft (h) of the extracting mechanism with the pin passing through the matching holes (f). The extracting mechanism has four main parts: a table (s), a handle (i), a sliding ratchet shaft (h), and a lever (j). The table (s), as already mentioned, has four legs (g) prepared to fit into the corner holes (q) of the female plate (e), that is centered with respect to the table legs (g) and the sliding shaft (h) which is engaged with the rectangular blade (k) which also centers the female plate (e) to the male plate (c). Said legs (g) provide sufficient separation between the female plate (e) and the table top (s) for engagement and disengagement of the rectangular blade (k) with the ratched sliding shaft (h) and providing easy withdrawl for the cutout drywall piece. The handle (i) has a rectangular guide (which could be any othe shape) inside, where the corresponding shaft (h) can slide back and forth; said shaft (h) is a rectangular bar (or of a shape corresponding to the guide) with one ratchet side to provide engagement with the retaining and pulling pawls (m) & (l), and a slot housing (k1) (if the rectangular blade is increased to two or mor so should be the slot housing, and in this case the part of the shaft of the slot housing should be enlarged to acomodate the rectangular blades) with one or more holes (f1) corresponding with the holes (f) of the rectangular blade (c) to receive a pin for mutual angagement; the arm lever (j) is attached to the handle (i) and free to be pressed and released, having attached to itself a pawl (m), that engages with the teeth of the shaft (h), forcing the shaft to move backwards each time the lever is pressed; in this way the male plate (c) is forced against the drywall panel (d) and the female plate (e) until the male plate (c) and the panel piece pass through the female plate (e), performing the desired opening in the drywall board (d). The whole tool can now be removed from the outlet box (b) and the female plate (e) from the table legs (g). Releasing the engagement between the pawls (m) & (l) and the shaft (h) with the lever (n), the said shaft can be returned to the starting position.-Removing the pin from hole (f), the rectangular blade (k) will be free, and the piece of drywall can easily be separated from the male plate (c). Now the tool is ready for the next operation.

Although preferred embodiments of the invention are described herein in detail, it will be understood by those skilled in the art that variations may be made thereto without departing from the spirit of the invention or the scope of the appended claims.

I claim:

1. A die-cutting tool for locating and cutting openings of a given size and shape in installed drywall boards, to permit access to electrical outlet boxes, said die-cutting tool comprising:

(a) an interior male plate having a lengthwise and widthwise perimeter of the same shape as the front face of the given outlet box, said plate having front and back flat surfaces, and,
      a plurality of spring prongs on said back surface that provide a temporary means of support to the outlet box for said plate by penetrating through the existing holes of the outlet box or friction against the inner walls of the outlet box if no holes are present;
      a rectangular knife blade attached perpendicularly at the center of the front surface of the plate, said blade terminating in a rectangular pyramidal sharp point having a hole across the width side to provide a connection with an extracting mechanism,
   (b) an exterior female plate having front and back flat surfaces with an interior opening of a slightly larger perimeter but identical shape as the male plate, with a plurality of fitting holes therein with which to secure the extracting mechanism;
   (c) said extracting mechanism having as a base, a table with a plurality of legs corresponding to said fitting holes on said female plate, and further including
      a handle with an interior rectangular guide, housing a rectangular sliding ratchet shaft, said shaft capable of moving back and forth and defining means for attachment to said knife blade; said handle having attached thereto a shaft-retaining pawl and an arm lever with a second pulling pawl co-operating with the ratchet shaft so that when the arm lever is pressed against the handle, a resulting backwards displacement is produced, pulling the male plate against the drywall board and the female plate, thus causing the said male plate to pass through the inside of the female plate, cutting out a piece of the drywall board in the same shape as the male plate and producing said opening in the panel in front of the outlet box.

2. A die-cutting tool for locating and cutting openings of a given size and shape in a suitable covering material to permit access to an underlying fixture, said die-cutting tool comprising:

(a) an interior male member having front and rear faces disposed on one side of said covering material and having first means for attachment to the said fixture and second means for penetrating said covering material to an opposite side thereof,
   (b) an extracting apparatus adapted for connection to said second means and for pulling said interior male member through said covering material from said one side to said opposite side thereof, and,
   (c) an exterior female member intermediate said extracting apparatus and said opposite side of said covering material, said female member having an opening of a slightly larger perimeter but identical shape as said interior male member, such that a sufficient space is created between said female member and said extracting apparatus for easy engagement and disengagement between the said second means for penetrating and said extracting apparatus and provide easy withdrawal of excess portions of said covering material removed, responsive to pulling said interior male member therethrough, said means for penetrating comprising rectangular knife blade means attached perpendicularly and symmetrically to the front face of said male member, said knife blade means terminating in a rectangular pyramidal sharp point.

3. A die-cuting tool of claim 2 wherein said penetrating means includes means of attachment to said extracting apparatus.

4. A die-cuting tool of claim 3 wherein said means of attachment includes at least one hole in said penetrating knife blade means.

5. A die-cutting tool of claim 4 wherein said extracting apparatus further comprises:

(d) a base;

(e) a table with a plurality of legs; and (f) a handle with an interior guide, housing a sliding rachet shaft, said shaft being capable of moving back and forth; said handle having attached a shaft-retaining pawl and an arm lever with a second pulling pawl cooperating with the rachet shaft so that when the arm lever is pressed against the handle, a resulting backwards displacement is produced, pulling the male plate against the covering material and the female member, thus causing the said male plate to pass through the inside of the female plate, cutting out a piece of the covering material in the same shape as the male plate and producing said opening in the panel in front of said fixture.

* * * * *